United States Patent [19]

Huser

[11] 4,235,564
[45] Nov. 25, 1980

[54] CUTTING TOOL

[75] Inventor: Jean P. Huser, Meggen, Switzerland

[73] Assignee: Utilis Müllheim AG, Switzerland

[21] Appl. No.: 974,492

[22] Filed: Dec. 29, 1978

[30] Foreign Application Priority Data

Dec. 31, 1977 [CH] Switzerland .................. 16288/77

[51] Int. Cl.³ .................................... B26D 1/12
[52] U.S. Cl. ................................ 407/101; 407/117
[58] Field of Search ..................... 407/101, 107, 117

[56] References Cited

U.S. PATENT DOCUMENTS

| 1,700,610 | 1/1929 | Drees | 407/117 |
| 2,293,006 | 8/1942 | Luers | 407/117 |
| 2,487,209 | 11/1949 | Anthony et al. | 407/117 |
| 3,205,557 | 9/1965 | Frommelt et al. | 407/117 |
| 3,758,927 | 9/1973 | Stein | 407/101 |
| 3,775,818 | 12/1973 | Sirola | 407/117 |
| 3,894,322 | 7/1975 | Pano | 407/117 |
| 4,051,584 | 10/1977 | Huser | 407/107 |
| 4,118,138 | 10/1978 | Takacs | 407/117 |

Primary Examiner—Harrison L. Hinson
Attorney, Agent, or Firm—Craig & Antonelli

[57] ABSTRACT

An arrangement for holding a cutting tool is detachably fastened to a receiving member on the left or right side or turned 180°. The arrangement includes a support and a clamp for firmly mounting at least one exchangeable cutting tip; for this purpose, in one embodiment, the support has a longitudinal groove and the clamp has a longitudinal serrated edge which extends into said groove.

In order to hold the cutting tip even more exactly in place, the clamp has a serrated edge which engages in a shape-mating connection in a slot arranged on the rear face of the cutting tip.

These tools are used especially as recessing tools on lathes.

14 Claims, 6 Drawing Figures

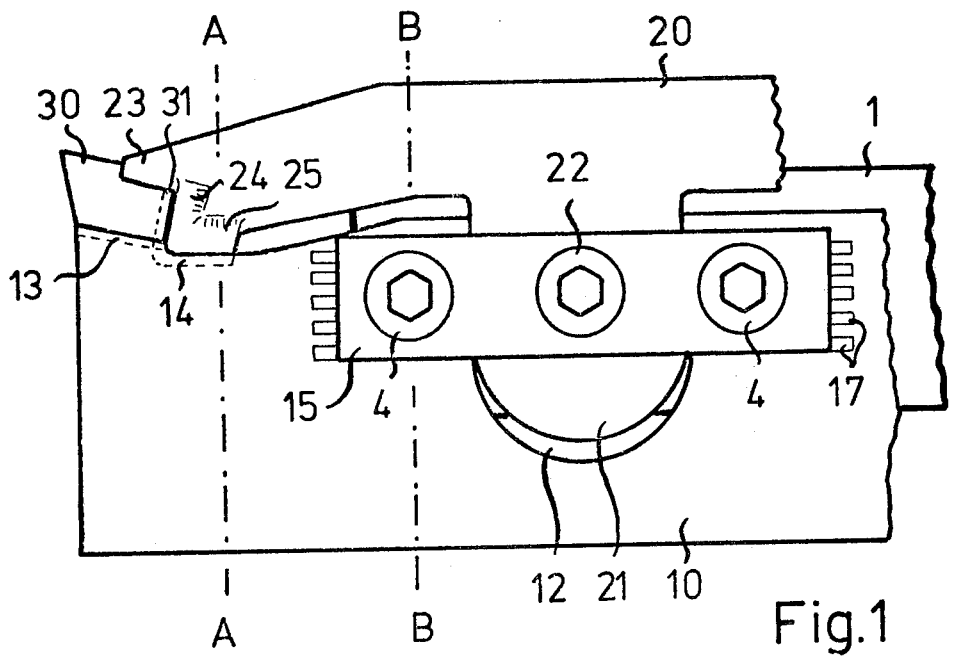
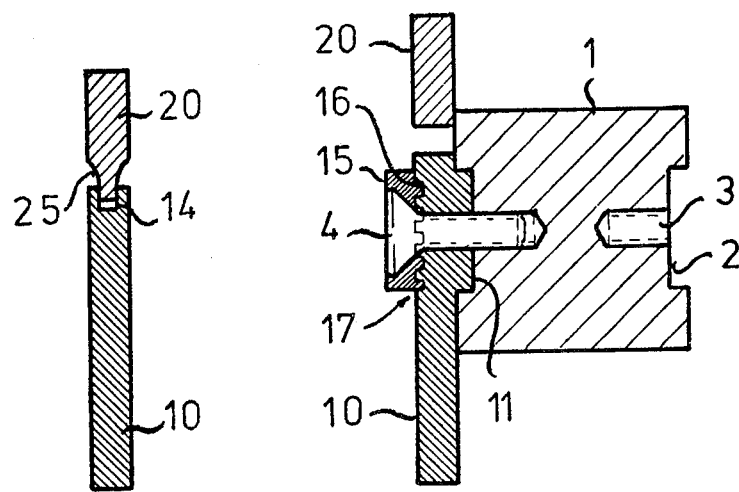
Fig. 1
Fig. 2
Fig. 3

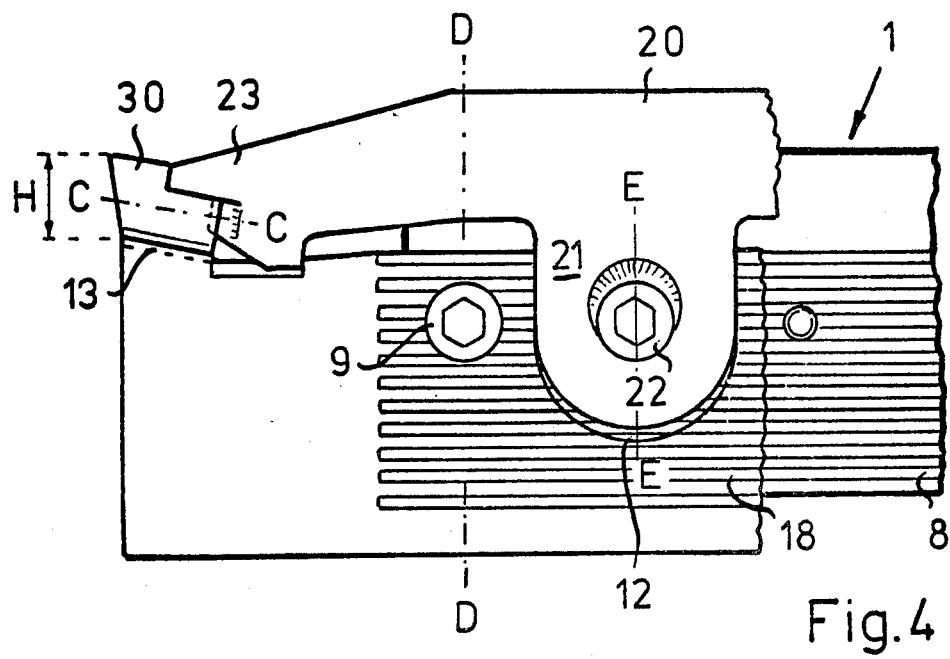
Fig. 4
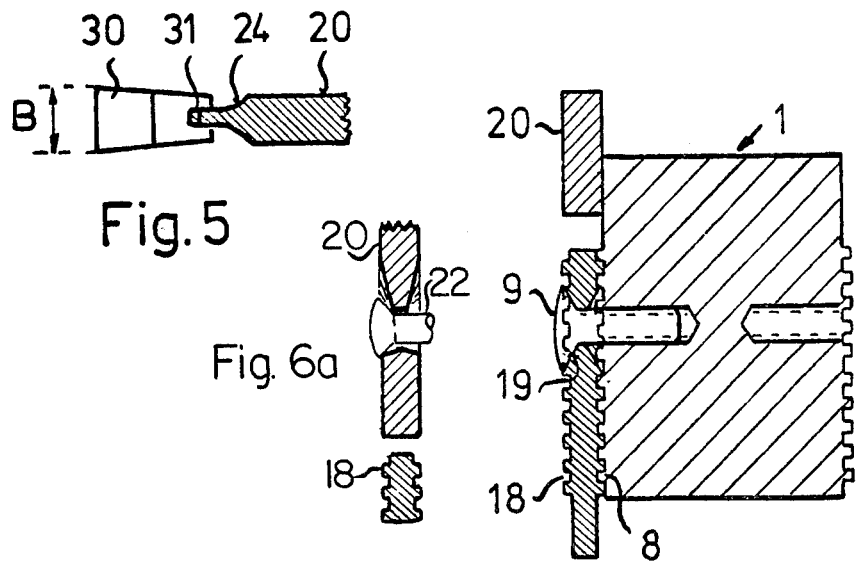
Fig. 5
Fig. 6a
Fig. 6

CUTTING TOOL

BACKGROUND AND SUMMARY OF THE INVENTION

A cutting tool is described in the U.S. Pat. No. 4,051,584 (which patent is hereby incorporated by reference to the extent necessary to complete an understanding hereof) that is characterized by a toolholder which includes a base and a clamp, and which can be mounted on a receiving member on the left or right side or rotated 180°, the base having a longitudinal groove and the clamp, which acts to firmly secure the cutting tip to the base, having a longitudinal edge that extends into the longitudinal groove of the base, and, additionally, the clamp has a tongue, which insures the aligned position of the clamp with respect to the base.

It has been found in practice that the exact attachment or guidance of the cutting tip could be improved. If the attachment error is considered as the sum of the partial errors, then it is clear that the mistakes occurring horizontally as well as those occurring vertically have to be reduced.

The present invention is directed to solving the noted problem and, according to a preferred embodiment, a tool as described in the above-cited patent is improved in that the longitudinal edge of the clamp engages in a shape-mating connection with the rear side of the cutting tip.

Another improvement in the guidance is obtained in that a yoke can be tightened over the tongue of the clamp, which tongue extends into the base. This yoke has a bearing surface, subdivided many times, in the form of furrows which extend into the base in grooves of the same cross section.

An even simpler solution can be achieved if the base is constructed in direct contact to the receiving member and both components have bearing surfaces, subdivided many times, in the area of their contact surfaces in the form of furrows, which are mutually engaged during operation.

These and other objects, features and advantages of the present invention will become more apparent from the following description when taken in connection with the accompanying drawings, which show, for purposes of illustration only, several embodiments in accordance with the present invention.

BRIEF DESCRIPTION OF THE DRAWINGS

FIG. 1 illustrates a tool in which the base with a yoke is pressed onto the receiving member;

FIG. 2 illustrates a partial section along line A—A of FIG. 1;

FIG. 3 is a cross sectional view taken along line B—B of the FIG. 1;

FIG. 4 shows a tool in which the base is pressed directly onto the receiving member;

FIG. 5 shows a partial section along line C—C of FIG. 4;

FIG. 5a is a partial section along line E—E of FIG. 4; and

FIG. 6 is a cross sectional view through the tool according to FIG. 4 and taken along line D—D.

DETAILED DESCRIPTION OF THE PLURAL EMBODIMENTS

In drawings the receiving member is designated by 1, and serves as a tool holder for mounting to the actual tool such as a lathe or some other machine tool. The receiving member 1 is symmetrically constructed in such a way that the tool can be attached thereto either on the left or on the right (as viewed in FIG. 3), as desired. As also can be seen from FIG. 3, the receiving member has respectively one groove 2 on each lateral face, which grooves have rectangular cross sections. Three bores 3 with interior threads extend into the support from the bottom of the grooves. Two of these bores 3 act to receive screws 4 for mounting the tool fixture support 10 to the receiving member 1.

In order to also attain a shape-mating connection between the support and the receiving member, besides the force-derived connection, the base has a strip 11 which fits into the rectangular groove 2.

A clamp 20 having a tongue 21 is fastened to the receiving member 1 by a screw 22. The tongue 21 has an eccentrically countersunk continuous bore (as in FIG. 6a) to grip the cutting tip 30 with the aid of the clamp 20. The tongue 21 of the clamp 20 extends exactly in the plane of the support 10. Therefore, the support has a recess 12 which has a shape approximately like that of the tongue. Furthermore, in the area where the cutting tip 30 is received, the support has a V-shaped groove 13 into which the cutting tip 30 engages with its likewise V-shaped basal surface. Due to the pressure of the flat projection 23 onto the upper face of the tip 30, this tip is guided in the manner of a prism. Then as a special feature the cutting tip 30 has a vertical, U-shaped slot 31 into which engages a serrated clamp edge 24 of a corresponding shape. This construction, even more than the prismatic guidance, guarantees that the cutting tip 30 will be held absolutely vertically.

In the FIG. 1 embodiment, the alignment of the clamp relative to the support 10 is fixed in place by a serrated edge 25 of clamp 20 which extends in a horizontal direction and is received in a corresponding groove 14. The exact shape can be seen from FIG. 2 and is a sectional view along line A—A of FIG. 1.

A yoke 15 with furrows 16 is employed to attain a favorable force distribution of the contact pressures which press the support 10 to the receiving member 1. These furrows 16 extend into similarly shaped grooves 17 of the support 10 (FIG. 3).

FIGS. 4-6 are analogous to FIGS. 1-3 and, in the following, only the differences will be pointed out. The most striking difference lies in the different type of connection between the support 10 and the receiving member 1.

The shape-mating connection between the support 10 and the receiving member 1 no longer occurs via the strip 11 and the groove 2, but rather by way of multiple divisions of the bearing surface in the form of furrows 18 on the support 10. The receiving member 1 is provided with corresponding grooves 8 which engage with the furrows of the support.

Further, the support 10 is provided with a countersunk bore 19 on both sides, because this base is attached directly, i.e. without a yoke. In order to maintain the contact surface of the screw 9 as large as possible, the angle of countersinking should also be of maximum magnitude. An angle of 120° has proven to be advantageous.

The embodiment shown in FIG. 4 only represents a meshing of the clamp with the cutting tip 30 by means of the serrated edge 24 and the slot 31, the edge equivalent to 25 of FIG. 1 being unserrated and cut-off at an angle.

The improvements, but especially the vertical meshing of the serrated edge 24 with the slot 31 of the cutting tip 30 are especially effective with narrow cutting tips, i.e. with cutting tips in which the ratio of height is great, with respect to the width.

The influence that the serration has on the guidance of the cutting tip 30 resides primarily in the better flux of force, resulting from the subdivision of the bearing surface, and the vibrations occurring during machining are received and damped in distribution.

Further, it is possible to employ the embodiment according to FIGS. 4–6 with a yoke 15.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. In a cutting assembly of the type comprising: a cutting tool means, a tool holder means, a support means for supporting said cutting tool means, clamping means for clamping said cutting tool means on said support means, said support means and said clamping means being provided with two opposed longitudinally extending surfaces, means provided on the opposed surfaces of said support means and said clamping means for receiving and accurately guiding said cutting tool means, guide means projecting outwardly from one of the opposed surfaces of said clamping means relative to said support means, groove means provided on the other of the opposed surfaces of said clamping means and said support means for laterally aligning said clamping means relative to said support means, groove means provided on the other of the opposed surfaces of said clamping means and said support means for receiving said guide means, means provided on one of the opposed surfaces of said support means and said clamping means for vertically aligning said clamping means relative to said support means, said guide means, said groove means and said means for vertically aligning said clamping means being arranged on said opposed surfaces substantially along a vertically extending center plane of said clamping means and said support means, and means for mounting said support means and said clamping means on said tool holder means, the improvement wherein said cutting tool means is provided with a substantially vertically oriented slot in a rear face thereof and wherein said clamping means has a substantially vertically oriented serrated edge which engages in a shape-mating connection within said slot for vertically securing said cutting tool means in a precise manner.

2. In a cutting assembly of the type comprising: a tool means, a tool holder means, a support means for supporting said cutting tool means including a tool fixture support, clamping means for clamping said cutting tool means on said tool fixture support including a clamping strap, means provided on said tool fixture support and said clamping strap for receiving and accurately guiding said cutting tool means, means for laterally aligning said clamping strap relative to said tool fixture support including at least one guide member provided along a surface of said clamping strap facing said tool fixture support, at least one guide groove means provided on said tool fixture support for receiving and guiding said at least one guide member, means formed along the surface of the clamping strap facing said tool fixture support for vertically aligning said clamping strap relative to said tool fixture support and said clamping strap on said tool holder means, the improvement wherein said cutting tool means is provided with a substantially vertically oriented slot in a rear face thereof and wherein said clamping means has a substantially vertically oriented serrated edge which engages in a shape-mating connection within said slot for vertically securing said cutting tool means in a precise manner.

3. In a cutting assembly of the type comprising: a cutting tool means, a tool holder means, a support means for supporting said cutting tool means including a tool fixture support, clamping means for clamping said cutting tool means on said tool fixture support including a clamping strap, means provided on said tool fixture support and said clamping strap, means provided on said tool fixture support and said clamping strap for receiving and accurately guiding said cutting tool means, means for laterally aligning said clamping strap relative to said tool fixture support including a guide member disposed along the surface of said clamping strap facing said tool fixture support and guide groove means provided on said tool fixture support for receiving a respective guide member, and wherein a means for vertically aligning said clamping strap relative to said tool fixture support is provided including at least one guide element disposed on said clamping strap substantially centrally of and laterally off-set with respect to said guide member, and wherein a means is provided for mounting said tool fixture support and said clamping means on said tool holder means, the improvement wherein said cutting tool means is provided with a substantially vertically oriented slot in a rear face thereof and wherein said clamping means has a substantially vertically oriented serrated edge which engages in a shape-mating connection within said slot for vertically securing said cutting tool means in a precise manner.

4. In a cutting assembly of the type comprising: a cutting tool means, a tool holder means, a support means for supporting said cutting tool means including a tool fixture support, clamping means for clamping said cutting tool means on said tool fixture support including a clamping strap, means provided on said tool fixture support and said clamping strap for receiving and accurately guiding said cutting tool means, means for laterally aligning said clamping strap relative to said tool fixture support including at least one guide member provided along a surface of said clamping strap facing said tool fixture support, and at least one guide groove means provided on said tool fixture support for receiving and guiding said at least one guide member, means for vertically aligning said clamping strap relative to said tool fixture support including at least one guide element provided on said clamping strap longitudinally spaced from said at least one guide member and disposed substantially co-planar therewith, the improvement wherein said cutting tool means is provided with a substantially vertically oriented slot in a rear face thereof and wherein said clamping means has a substantially vertically oriented serrated edge which engages in a shape-mating connection within said slot for vertically securing said cutting tool means in a precise manner.

5. In a cutting assembly of the type comprising: a cutting tool means, a tool holder, a support means for supporting said cutting tool means including a tool fixture support, clamping means for clamping said cutting tool means on said support means including a clamping strap, means provided on said tool fixture support and said clamping strap for receiving and accurately guiding said cutting tool means, means for laterally aligning said clamping strap relative to said tool fixture support including at least one guide member provided along a surface of said clamping strap facing said tool fixture support, at least one guide groove means provided along a first surface of said tool fixture support for receiving and guiding said at least one guide member, and at least one further guide groove means, provided along a second surface of said tool fixture support for receiving and guiding said at least one guide member, said second surface being disposed in spaced parallel relationship to said first surface whereby said tool fixture support is reversibly mountable on said tool holder means, means for vertically aligning said clamping strap relative to said tool fixture support, and means for mounting said tool fixture support and said clamping strap on said tool holder means, the improvement wherein said cutting tool means is provided with a substantially vertically oriented slot in a rear face thereof and wherein said clamping means has a substantially vertically oriented serrated edge which engages in a shape-mating connection within said slot for vertically securing said cutting tool means in a precise manner.

6. In a cutting assembly of the type comprising: a cutting tool means, a tool holder means, a support means for supporting said cutting tool means, clamping means for clamping said cutting tool means on said support means, means provided on said support means and said clamping means for receiving and accurately guiding said cutting tool means, means for laterally aligning said clamping means relative to said support means including guide means provided on one of said clamping means and said support means, and guide groove means provided on the other of said supporting means and clamping means for receiving said guide means, said clamping means being resilient in the vertical direction, means for vertically aligning said clamping means relative to said support means, and means for mounting said support means and said clamping means on said tool holder means, the improvement wherein said cutting tool means is provided with a substantially vertically oriented slot in a rear face thereof and wherein said clamping means has a substantially vertically oriented serrated edge which engages in a shape-mating connection within said slot for vertically securing said cutting tool means in a precise manner.

7. In a cutting assembly of the type comprising: a cutting tool means, a tool holder means, a support means for supporting said cutting tool means, clamping means for clamping said cutting tool means on said support means, means provided on said support means and said clamping means for receiving and accurately guiding said cutting tool means, means provided on said clamping means and said support means for laterally aligning said clamping means relative to said support means, means formed along a surface of the clamping means facing the support means for vertically aligning said clamping means relative to said support means, means provided at the support means for accommodating said vertical aligning means, and means for mounting said support means and said clamping means on said tool holder means including at least one longitudinally extending groove means provided on one of said support means and said tool holder means, and at least one longitudinally extending projection means provided on the other of said support means and said tool holder means, said projection means being received in said at least one groove means for aligning said support means relative to said tool holder means, the improvement wherein said cutting tool means is provided with a slot in a rear face thereof and wherein said clamping means has a serrated edge which engages in a shape-mating connection within said slot for vertically securing said cutting tool means in a precise manner.

8. A cutting tool assembly of the type comprising: a support means for supporting said cutting tool means, clamping means for clamping said cutting tool means on said support means, said support means and said clamping means being provided with two opposed longitudinally extending surfaces, means provided on the opposed surfaces of said support means and said clamping means for receiving and accurately guiding said cutting tool means, guide means projecting outwardly from one of the opposed surfaces of said clamping means and said support means for laterally aligning said clamping means and said support means for receiving said guide means, means provided on one of the opposed surfaces of said support means and said clamping means for vertically aligning said clamping means relative to said support means, said guide means, said groove means and said means for vertically aligning said clamping means being arranged on said opposed surfaces substantially along a vertically extending center plane of said clamping means and said support means, and means for mounting said support means and said clamping means on said tool holder means, the improvement wherein said cutting tool means is provided with a slot in a rear face thereof and wherein said clamping means has a serrated edge which engages in a shape-mating connection with said slot, wherein said means for mounting includes a yoke, tightenable over a protruding portion of the clamping means and having a bearing surface, subdivided many times, in the form of furrows which extend in grooves of the same cross section formed in said support means.

9. A cutting tool according to claims, 1, or 2 or 3 or 4 or 5 or 6 or 7, characterized in that the protruding portion of the clamping means is approximately the same thickness as the remainder of the clamping means and lies in one plane therewith.

10. A cutting tool according to claim 1 or 2 or 3 or 4 or 5 or 6 or 7, wherein bores are provided for fastening screws securing said clamping means and said support to said tool holder means, said bores having countersunk sections of more than 90°.

11. A cutting tool according to claims 1, or 2 or 3 or 4 or 5 or 6 or 7, or 8, wherein the clamping means has a further serrated edge which engages in a groove in the support means.

12. A cutting tool assembly of the type comprising a cutting tool means, a tool holder means, a support means for supporting said cutting tool means including a tool fixture support, clamping means for clamping said cutting tool means on said tool fixture support including a clamping strap, means provided on said tool fixture support and said clamping strap for receiving and accurately guiding said cutting tool means, means for laterally aligning said clamping strap relative to said tool fixture support including a guide member disposed along the surface of said clamping strap facing said tool fixture support and guide groove means provided on said tool fixture support for receiving a respective guide member, and wherein a means for vertically aligning said clamping strap relative to said tool fixture support is provided including at least one guide element disposed on said clamping strap substantially centrally of and laterally off-set with respect to said guide member, and wherein a means is provided for mounting said tool fixture support and said clamping means on said tool holder means, the improvement wherein said cutting tool means is provided with a slot in a rear face thereof and wherein said clamping means has a serrated edge which engages in a shape-mating connection with slot, wherein said means for mounting includes a yoke, tightenable over a protruding portion of the clamping means and having a bearing surface, subdivided many times, in the form of furrows which extend in grooves of the same cross section formed in said support means.

13. In a cutting assembly of the type comprising: a cutting tool means, a tool holder means, a support means for supporting said cutting tool means including a tool fixture support, clamping means for clamping said cutting tool means on said tool fixture support including a clamping strap, means provided on said tool fixture support and said clamping strap for receiving and accurately guiding said cutting tool means, means for laterally aligning said clamping strap relative to said tool fixture support including at least one guide member provided along a surface of said clamping strap facing said tool fixture support, and at least one guide groove means provided on said tool fixture support for receiving and guiding said at least one guide member, means for vertically aligning said clamping strap relative to said tool fixture support including at least one guide element provided on said clamping strap longitudinally spaced from said at least one guide member and disposed substantially co-planar therewith, the improvement wherein said cutting tool means is provided with a slot in a rear face thereof and wherein said clamping means has a serrated edge which engages in a shape-mating connection with said slot, wherein said means for mounting includes a yoke, tightenable over a protruding portion of the clamping means and having a bearing surface, subdivided many times, in the form of furrows which extend in grooves of the same cross section formed in said support means.

14. In a cutting assembly of the type comprising: a cutting tool means, a tool holder means, a support means for supporting said cutting tool means, clamping means for clamping said cutting tool means on said support means, means provided on said support means and said clamping means for receiving and accurately guiding said cutting tool means, means for laterally aligning said clamping means relative to said support means including guide means provided on one of said clamping means and said support means, and guide groove means provided on the other of said supporting means and clamping means for receiving said guide means, said clamping means being resilient in the vertical direction, means for vertically aligning said clamping means relative to said support means, and means for mounting said support means and said clamping means on said tool holder means, the improvement wherein said cutting tool means is provided with a slot in a rear face thereof and wherein said clamping means has a serrated edge which engages in a shape-mating connection with said slot, wherein said means for mounting includes a yoke, tightenable over a protruding portion of the clamping means and having a bearing surface, subdivided many times, in the form of furrows which extend in grooves of the same cross section formed in said support means.

* * * * *